United States Patent
Siess

(10) Patent No.: US 8,140,299 B2
(45) Date of Patent: Mar. 20, 2012

(54) OPERATING METHOD FOR A SENSOR AND A CONTROL FACILITY COMMUNICATING WITH THE SENSOR

(75) Inventor: Rainer Siess, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 687 days.

(21) Appl. No.: 12/227,268

(22) PCT Filed: Mar. 16, 2007

(86) PCT No.: PCT/EP2007/052540
§ 371 (c)(1),
(2), (4) Date: Nov. 12, 2008

(87) PCT Pub. No.: WO2007/131820
PCT Pub. Date: Nov. 22, 2007

(65) Prior Publication Data
US 2009/0210186 A1    Aug. 20, 2009

(30) Foreign Application Priority Data
May 17, 2006 (DE) .......................... 10 2006 023 213

(51) Int. Cl.
*G06F 11/30* (2006.01)
(52) U.S. Cl. .............................................. 702/185
(58) Field of Classification Search .................... 702/185
See application file for complete search history.

(56) References Cited

U.S. PATENT DOCUMENTS

| | | | | |
|---|---|---|---|---|
| 4,916,432 A | * | 4/1990 | Tice et al. | 340/518 |
| 5,956,659 A | | 9/1999 | Spies et al. | |

FOREIGN PATENT DOCUMENTS

| | | |
|---|---|---|
| DE | 19539458 A1 | 4/1997 |
| DE | 19712622 A1 | 10/1998 |
| EP | 0800059 A1 | 10/1997 |
| WO | WO 2004031695 A1 | 4/2004 |

* cited by examiner

*Primary Examiner* — Drew A Dunn
*Assistant Examiner* — Stephen Cherry

(57) ABSTRACT

A sensor has a detection device and an evaluation device to detect an analog signal, to determine a digital signal and to transmit the digital signal to a control device outside the sensor. The analog signal and/or the digital signal is supplied to a monitoring device of the sensor. An enable signal is transmitted to the control device only if the device being monitored is operating correctly. In a normal mode, the control device processes the digital signal further. Otherwise, it deems the transmitted digital signal to be defective and outputs a message using a malfunction of the sensor. On account of the transmission of the test signal, the sensor assumes a test mode in which it manipulates the signals which are supplied to the monitoring device in such that the monitoring device detects that the device being monitored is not operating correctly. In the test mode, the control device outputs a message using a malfunction of the sensor if the enable signal is transmitted to it in addition to each.

12 Claims, 5 Drawing Sheets

OPERATING METHOD FOR A SENSOR AND A CONTROL FACILITY COMMUNICATING WITH THE SENSOR

CROSS REFERENCE TO RELATED APPLICATIONS

This application is the US National Stage of International Application No. PCT/EP2007/052540 filed Mar. 16, 2007, and claims the benefit thereof. The International Application claims the benefits of German application No. 10 2006 023 213.5 DE filed May 17, 2006. Both of the applications are incorporated by reference herein in their entirety.

FIELD OF INVENTION

The present invention relates to an operating method for a sensor and a control facility communicating with the sensor.

BACKGROUND OF INVENTION

Such operating methods are known from DE-A-102 44 583 for example.

With the known operating methods for a sensor the sensor uses a detection facility to detect at least one analog signal, uses the at least one analog signal to determine at least one digital signal by means of an evaluation facility and transmits the at least one digital signal to a control facility outside the sensor. The at least one analog signal is also supplied to a monitoring facility of the sensor. The monitoring facility uses the analog signals supplied to it to monitor the correct operation of the detection facility. The monitoring facility only transmits an enable signal to the control facility outside the sensor, if the detection facility is operating correctly.

The sensor repeats the steps listed above regardless of whether or not it is in test mode. The sensor assumes test mode when a test signal is transmitted to it. In test mode the sensor manipulates the analog signal supplied to the monitoring facility in such a manner that the monitoring facility identifies that the detection facility is not operating correctly, when the monitoring facility is operating correctly.

A corresponding operating method for the control facility is also known from DE-A-102 44 583. In the context of this operating method the control facility receives the digital signal cyclically from the sensor. It checks whether an enable signal is also transmitted to it in addition to the digital signal. The control facility carries out these steps regardless of whether it is in a normal mode or a test mode. It repeats these steps cyclically.

In normal mode the control facility processes the at least one digital signal further when the enable signal is transmitted to it in addition to the at least one digital signal. Otherwise the control facility evaluates the transmitted digital signal as defective and outputs a message relating to a malfunction of the sensor.

From time to time the control facility transmits a test signal to the sensor and switches from normal mode to test mode. In test mode the control facility outputs a message relating to a malfunction of the sensor, when an enable signal is transmitted to it in addition to any digital signal transmitted during test mode. In test mode the control facility awaits the occurrence of an internal event inside the control facility and then switches automatically back from test mode to normal mode.

Electronic control facilities for industrial machines require a measured value supplied by a sensor at regular intervals, in other words cyclically, in order to be able to control a machine or system correctly. Examples of such control facilities are programmable logic controllers (PLC) and computer numerical controllers (CNC).

Earlier the analog signal detected by a detection facility of the sensor was itself first transmitted to the control facility for this purpose. With this type of data transmission it was possible—in some instances at least—for the control facility to monitor the correct operation of the sensor. This was particular true when the sensor transmitted a number of mutually correlated analog signals. One example of such mutually correlated analog signals is the sine and cosine signals of an incremental sensor, as these two signals have a 90° phase offset to one another and have essentially the same amplitude.

Sensors are also known, wherein digital signals derived from the analog signals are transmitted to the control facility in additional to the analog signals. With these sensors it is also possible—in some instances at least—for the control facility to monitor the sensor.

Sensors have become known more recently, which transmit the analog signals they detect to the control facility solely digitally. An example of such a sensor is described in the above-mentioned DE-A-102 44 583. With this sensor the control facility can no longer identify from the transmitted digital signal whether or not the sensor is operating correctly. Additional measures are therefore required in order to be able to identify any malfunction of the sensor. In particular a monitoring facility can be present in the sensor to monitor the detection facility. The monitoring facility and its operation are also described in the above-mentioned DE-A-102 44 583.

SUMMARY OF INVENTION

An object of the present invention is to optimize the known operating methods for the sensor and the control facility.

The object for a sensor is achieved by an operating method and for a control facility by an operating method as claimed in the independent claims.

In test mode the sensor awaits the occurrence of an internal event inside the sensor and then automatically quits test mode. The control facility switches correspondingly from test mode to normal mode without transmitting a signal to the sensor, which is not also transmitted to the sensor in normal mode.

The operating methods allow program code and computation time to be minimized in the control facility. It is also no longer possible for unpredicted delays in the program sequence in the control facility to prevent test mode of the sensor being reset. The data to be transmitted from the control facility to the sensor is also minimized.

Further, computer readable mediums are provided, on each of which a computer program is stored. The computer programs cause a sensor or control facility to be operated according to an operating method described above, when the computer program is loaded into the sensor or control facility and executed by the sensor or control facility.

The object is also achieved by a system having a sensor, which is configured, in particular programmed, in such a manner that it executes such an operating method. The sensor can in particular be configured as an ASIC. Further, the system has a control facility, which is configured, in particular programmed, in such a manner that it executes such an operating method.

It is possible for the internal event inside the sensor to be an expiry of an internal sensor test time interval inside the sensor started by the sensor based on transmission of the test signal. The sensor test time interval is preferably a whole-number multiple of a cycle time, with which the sensor operates. It is possible for the sensor to determine the sensor test time interval based on the test signal.

Alternatively it is possible for the internal event inside the sensor to be the reaching of a number of transmissions of the at least one digital signal, calculated from the assumption of test mode. As with the sensor test time interval it is also possible in this instance for the sensor to determine the number of transmissions of the at least one digital signal based on the test signal.

Similarly the internal event inside the control facility can be an expiry of an internal control facility test time interval inside the control facility started by the control facility based on transmission of the test signal. Here too the control facility test time interval is preferably a whole-number multiple of a cycle time, with which the control facility operates. It is also possible for the test signal to be a function of the control facility test time interval.

The internal event inside the control facility can be the reaching of a number of determinations of the at least one digital signal, calculated from the assumption of test mode. It is possible again here for the test signal to be a function of the number of transmissions of the at least one digital signal.

BRIEF DESCRIPTION OF THE DRAWINGS

Further advantages and details will emerge from the description which follows of exemplary embodiments in conjunction with the drawings, in which essentially.

DETAILED DESCRIPTION OF INVENTION

Figure 1:
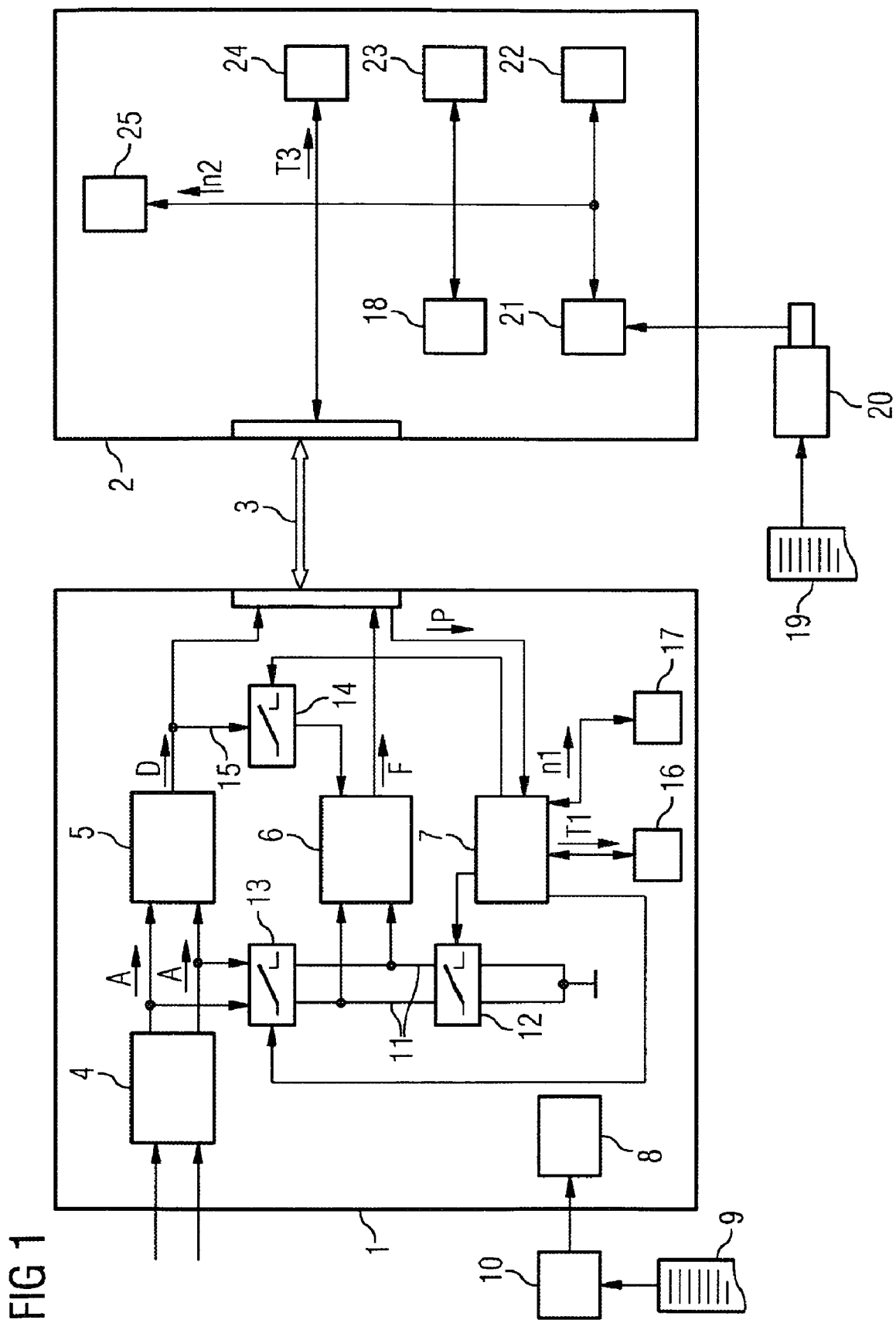
FIG. 1 shows a block circuit diagram of a sensor and a control facility.

According to FIG. 1 a sensor 1 and a control facility 2 can communicate with one another by way of a data channel 3. The data channel 3 can be a single-core or multi-core cable (copper, coaxial, optical waveguide) or a cable-free connection (wireless, infrared, etc.) for example.

According to FIG. 1 the sensor 1 has a detection facility 4, an evaluation facility 5, a monitoring facility 6 and a manipulation facility 7. It can also have an intelligent unit 8, for example a microprocessor or a microcontroller.

The sensor 1 can have discrete structural elements. It is preferably configured as an ASIC.

If the intelligent unit 8 is not present, the sensor 1 is configured based on a corresponding circuit-related embodiment in such a manner that it executes an operating method, which is described in more detail below in conjunction with FIGS. 2 to 6. If the sensor 1 has the intelligent unit 8, the intelligent unit 8 executes a computer program 9. In this instance the sensor 1 is programmed in such a manner that it executes the operating method.

The computer program 9 is stored in the sensor 1, for example by means of a programming facility (not shown for reasons of clarity). In this instance the computer program 9 is stored on a data medium 10 in the programming facility for example. When the computer program 9 is loaded into the sensor 1 and executed by the sensor 1 (or the intelligent unit 8), it causes the sensor 1 to execute the operating method described in more detail below in conjunction with FIGS. 2 to 6. In this instance the operation of the individual facility 4 to 7 of the sensor 1 described below takes place based on corresponding actuation by the intelligent unit 8. Such actuation is shown with a broken line in FIG. 1.

Figure 2:
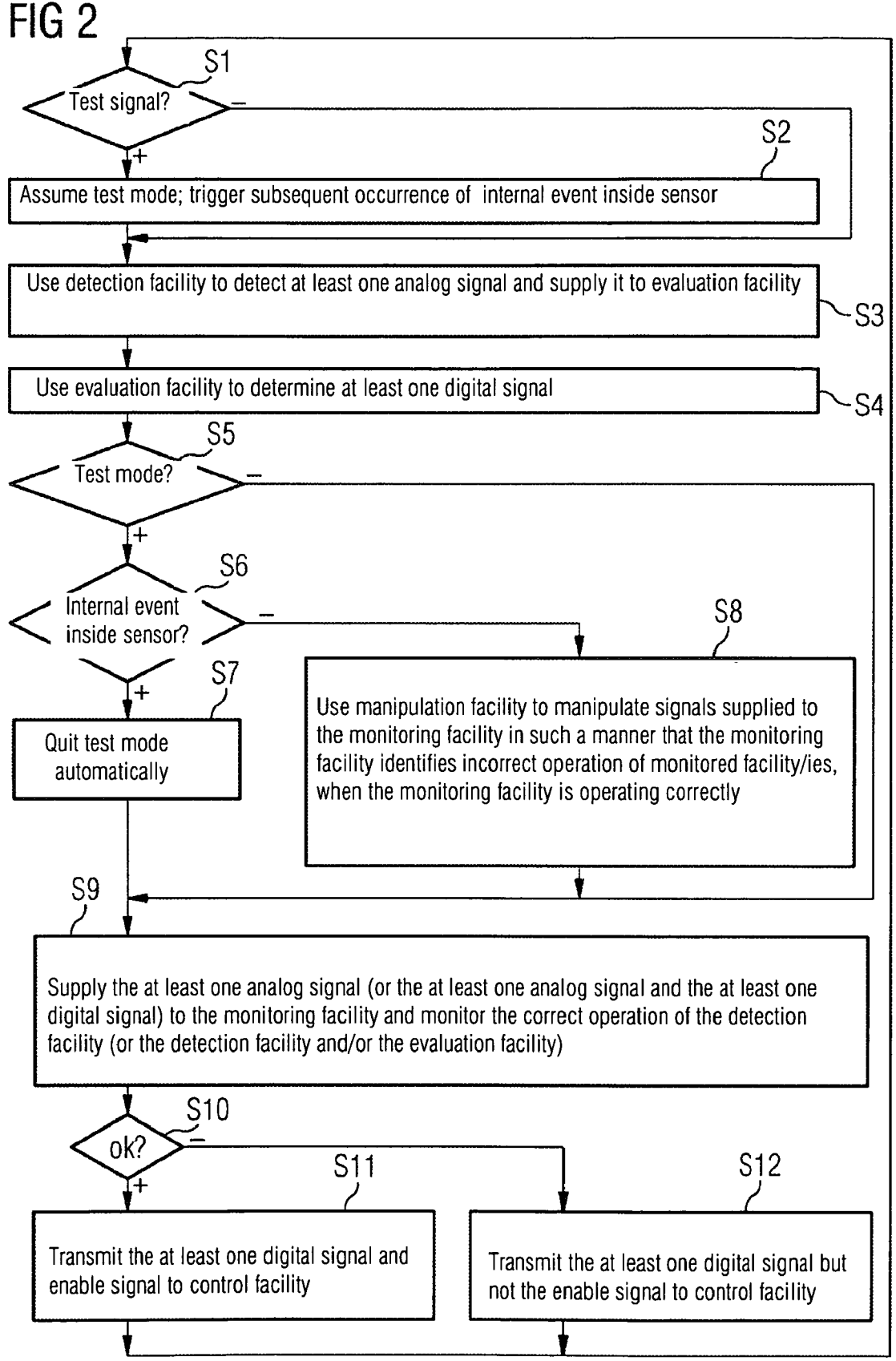
FIGS. 2 to 11 show flow diagrams.

According to FIG. 2 in a step S1 the sensor 1 checks whether a test signal P is transmitted to it from the control facility 2. If the test signal P is transmitted to the sensor 1, in a step S2 the sensor 1 assumes a test mode. In the context of step S2 the sensor 1 also triggers a subsequent occurrence of an internal event inside the sensor. Otherwise the sensor 1 passes directly to a step S3.

In step S3 the sensor 1 uses the detection facility 4 to detect at least one analog signal A. The sensor 1 supplies the detected analog signal A (or where there is more than one detected analog signal A, the detected analog signals A) to the evaluation facility 5 in the context of step S3.

According to FIG. 1 two analog signals A are detected for example. The two detected analog signals A can in particular be the sine and cosine signals of an incremental distance sensor.

In a step S4 the sensor 1 uses the analog signals A to determine at least one digital signal D by means of the evaluation facility 5. A number of digital signals D can also be determined.

The number of determined digital signals D can be identical to or different from the number of detected analog signals A. According to the exemplary embodiment a single digital signal D is determined, namely a position signal determined from the sine and cosine signals.

In a step S5 the sensor 1 checks whether it is in test mode. If the sensor 1 is not in test mode, it skips steps S6 to S8 and passes directly to a step S9.

In step S9 the sensor 1 supplies at least the at least one analog signal A to the monitoring facility 6. If only the analog signal A is supplied to the monitoring facility 6, the monitoring facility 6 monitors the correct operation of the detection facility 4. For example the monitoring facility 6 can form the sum of the squares of the analog signals A and check whether this sum signal lies between a predetermined minimum value and a predetermined maximum value. Only if it lies within the value range defined by the minimum value and the maximum value is the detection facility 4 deemed to be operating correctly.

If the analog signals A and the digital signal D or digital signals D are supplied to the monitoring facility 6, the monitoring facility 6 can as an alternative monitor the correct operation of just the detection facility 4, just the evaluation facility 5 or the detection facility 4 and the evaluation facility 5.

The detection facility 4 can be monitored using the analog signals A as before. The detection facility 5 can for example be monitored by the monitoring facility 6 also determining a digital signal independently of the evaluation facility 5 and comparing the digital signal it determines with the digital signal D determined by the evaluation facility 5.

In a step S10 the sensor 1 checks whether the monitored facility (the detection facility 4 or the evaluation facility 5, depending on the embodiment) or the monitored facility 4, 5 (in other words the detection facility 4 and the evaluation facility 5) are operating correctly. If correct operation is identified, in a step S11 the sensor 1 transmits the at least one digital signal D and an enable signal F to the control facility 2. If incorrect operation is identified, the sensor 1 only transmits the digital signal D to the control facility 2, not the enable signal F. In some instances it is possible to transmit an error signal instead of the enable signal F.

Regardless of whether the sensor has executed step S11 or step S12, it then goes back to step S1.

It can be seen from the above that the sensor 1 repeats steps S1 to S12 cyclically with a cycle time T. It can also be seen that the sensor 1 executes steps S1 to S12 regardless of whether or not it is in test mode.

If the check in step S5 shows that the sensor 1 is in test mode, the sensor 1 executes step S6 and one of steps S7 and S8. In step S6 the sensor 1 checks whether an internal event inside the sensor has occurred. If the internal event inside the sensor has occurred, the sensor 1 executes step S7 and then passes to step S9. If however the internal event inside the sensor has not occurred, the sensor 1 executes step S8 and then passes to step S9.

In step S7 the sensor 1 automatically quits test mode. In step S8 the sensor 1 uses the manipulation facility 7 to manipulate the signals A supplied to the monitoring facility 6 and/or the signals A, D supplied to the monitoring facility 6 in such a manner that the monitoring facility 6 identifies incorrect operation of the monitored facility 4, 5 or the monitored facility 4, 5, when the monitoring facility 6 itself is operating correctly.

For example the manipulation facility 7 can connect cables 11, by way of which the analog signals A are supplied to the monitoring facility 6, to a reference potential (e.g. ground) by means of a first switching facility 12, so that the sum of the squares of the analog signals A lies outside the permissible value range. A reaction affecting the analog signals A themselves can be avoided for example by the manipulation facility 7 actuating a second switching facility 13, by means of which the monitoring facility 6 is isolated from the detection facility 4. Alternatively it would also be possible to arrange resistors in the cables 11, in place of the second switching facility 13.

If the digital signal D is also supplied to the monitoring facility 6, the manipulation facility 7 can for example also actuate a third switching facility 14, which is arranged in a connecting cable 15, by way of which the digital signal D is supplied to the monitoring facility 6.

One possible internal event inside the sensor within the meaning of step S2 and S6 in FIG. 2 is in particular the expiry of an internal sensor test time interval T1 inside the sensor started by the sensor 1 based on transmission of the test signal P. This instance is described below in conjunction with FIGS. 3 and 4.

Figure 3:
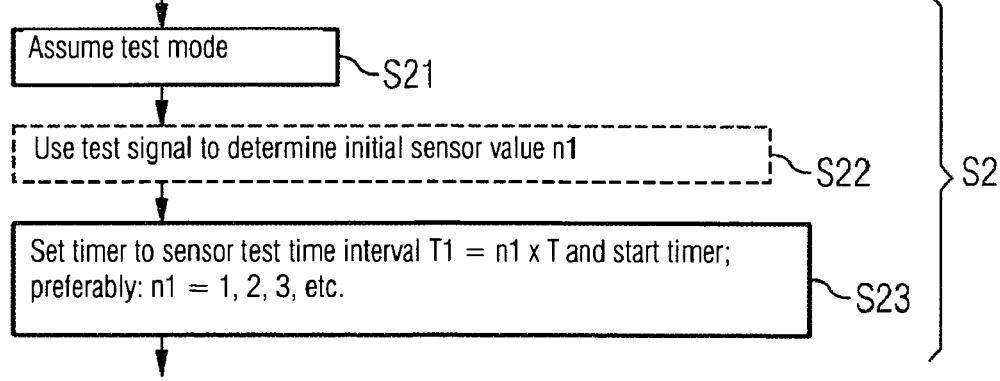

According to FIG. 3, which shows a possible implementation of step S2 in FIG. 2, in a step S21 the sensor 1 first assumes test mode. The sensor 1 then uses the test signal P to determine an initial sensor value n1. Step S22 is merely optional. It is therefore only shown with a broken line in FIG. 3. If step S22 is omitted, the initial sensor value n1 is predetermined in a fixed manner inside the sensor.

In a step S23 the sensor 1 sets a timer 16 to the sensor test time interval T1. The sensor test time interval T1 is a product of the initial sensor value n1 and the cycle time T. The sensor 1 starts the timer 16 in the context of step S23.

The initial sensor value n1 is preferably a whole number. The sensor test time interval T1 is therefore preferably a whole-number multiple of the cycle time T. However this is not essential.

Figure 4:
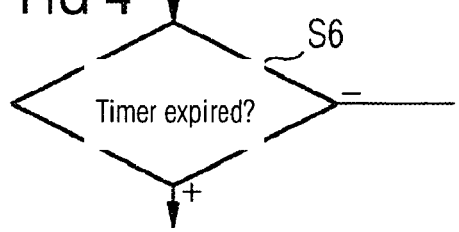

In the case of the embodiment of step S2 according to FIG. 3 it is only necessary for the implementation of step S6 to check in the context of step S6 according to FIG. 4 whether the timer 16 has expired.

As an alternative to the expiry of the internal sensor test time interval T1 inside the sensor, it is possible for the internal event inside the sensor to be the reaching of a number of transmissions of the at least one digital signal, calculated from the assumption of test mode. This instance is described in more detail below in conjunction with FIGS. 5 and 6.

Figure 5:
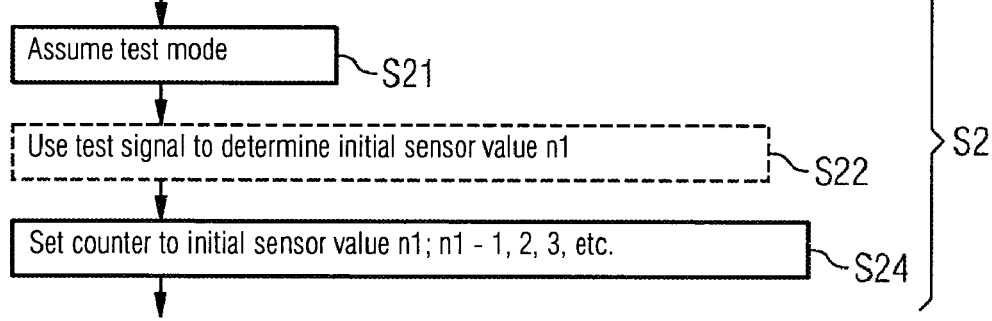

According to FIG. 5 steps S21 and S22 (see FIG. 3) are also executed. Step S22 is also merely optional with the embodiment according to FIG. 5 and is therefore only shown with a broken line in FIG. 5.

A step S24 is present instead of step S23. In step S24 the sensor 1 sets a counter 17 to the initial sensor value n1. Because a counter value is now used, with the embodiment according to FIG. 5 the initial sensor value n1 must be a whole number. It can therefore assume the value one, the value two, the value three, etc.

Figure 6:
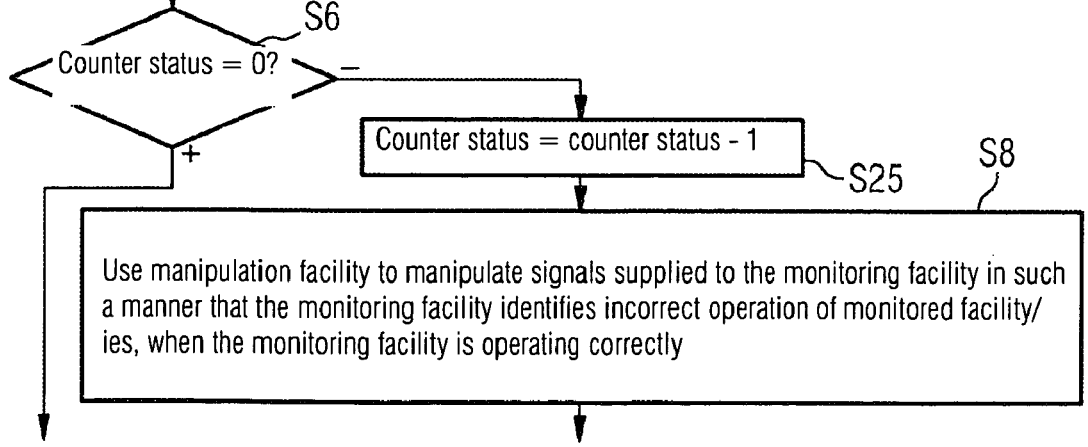

In the case of the embodiment of step S2 according to FIG. 5 it is necessary for the implementation of step S6, first of all to request the counter status of the counter 17 in the context of step S6 according to FIG. 6. A step S25 is also inserted between steps S6 and S8. In step S25 the counter status of the counter 17 is decremented by one.

The control facility 2 generally has a microprocessor 18, whose mode of operation is determined by a computer program 19. The computer program 19 is stored on a data medium 20. According to FIG. 1 the data medium is configured for example as a USB memory stick 20. The computer program 19 is supplied to the control facility 2 by way of a suitable interface 21, by way of which it is written into an internal memory 22 of the control facility 2.

When the computer program 19 is loaded into the control facility 2 and executed by the control facility 2, it causes the control facility 2 to execute an operating method, which is described in more detail below in conjunction with FIGS. 7 to 11.

Figure 7:
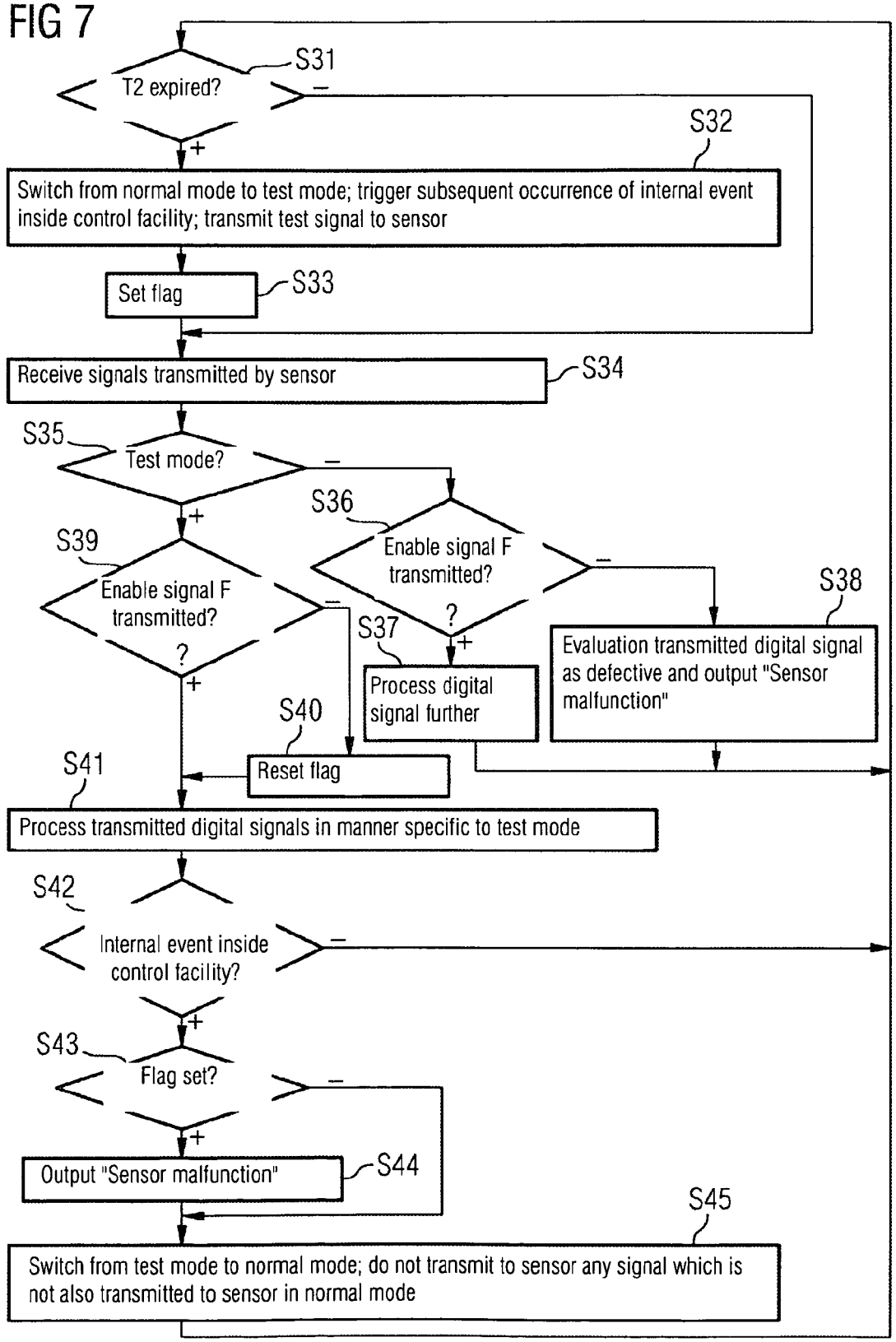

According to FIG. 7 the control facility 2 first checks in a step S31 whether a check time T2 has expired. The check time T2 is considerably longer than the cycle time T. The cycle time T is in particular generally in the region of a few milliseconds, sometimes even less. The check time T2 is in the region of seconds, minutes or hours, sometimes even longer.

When the check time T2 has expired, the control facility 2 switches from a normal mode to a test mode. In the context of step S32 it also triggers a subsequent occurrence of an internal event inside the control facility. Finally in the context of step S32 it transmits the test signal P to the sensor 1.

In a step S33 the control facility 2 sets a flag 23.

In a step S34 the control facility 2 receives signals D, F transmitted by the sensor 1. The signals D, F transmitted by the sensor 1 include at least the at least one digital signal D. They can also include a number of digital signals D. The signals D, F transmitted by the sensor 1 can also include the enable signal F.

In a step S35 the control facility 2 checks whether it is in test mode. If the control facility 2 is not in test mode, it passes to a step S36. In step S36 the control facility 2 checks whether the enable signal F has also been transmitted to it in addition to the at least one digital signal D in the context of step S34. If the enable signal F has been transmitted, the control facility 2 executes a step S37. In step S37 the control facility 2 processes the digital signal D further. If the enable signal F was not also transmitted to the control facility 2, the control facility 2 executes a step S38. In step S38 the control facility 2 evaluates the transmitted digital signal D as defective. Also in the context of step S38 it outputs a message relating to a malfunction of the sensor 1. The message can be a data-based message to another facility. Alternatively or additionally it can be a message, which can be directly perceived by a human with one of his/her sensory organs, in particular an optical and/or acoustic message.

Regardless of whether the control facility 2 has executed step S37 or step S38, it then goes back to step S31.

If the control facility 2 ascertains in step S35 that it is in test mode, it passes to a step S39. In step S39 the control facility 2 also checks whether the enable signal F has been transmitted to it. If the enable signal F has not been transmitted to it, it executes a step S40, in which it resets the flag 23. Regardless of whether or not the control facility 2 executes step S40, the control facility 2 continues to process the method further with a step S41.

In step S41 the control facility 2 processes the transmitted digital signals D in a manner specific to test mode. The further processing of the digital signals D in a manner specific to test mode can correspond to correct further processing (as in step S37). Other processing modes are also possible. The processing mode used is at the discretion of the person skilled in the art.

The control facility 2 then executes a step S42. In step S42 the control facility 2 checks whether the internal event inside the control facility triggered in step S32 has occurred. If the event has not occurred, the control facility 2 goes back to step S31.

If the internal event inside the control facility has occurred, in a step S43 the control facility 2 checks whether the flag 23 is set. If the flag 23 is set, in a step S44 the control facility outputs a message relating to a malfunction of the sensor 1 (specifically of the monitoring facility 6 of the sensor 1).

Regardless of whether or not the control facility 2 executes step S44, a step S45 is executed. In step S45 the control facility 2 switches automatically back from test mode to normal mode. The switch back to normal mode takes place without any further measures. In particular in the context of step S45 the control facility 2 does not transmit to the sensor 1 any signal, which is not also transmitted to the sensor 1 in normal mode.

It can be seen from the above that step S44 is only executed if the enable signal F is also transmitted to the control facility 2 in addition to any digital signal D transmitted during test mode. It can also be seen that the control facility 2 repeats the operating method described in conjunction with FIG. 7 with cycle time T.

As with the internal event inside the sensor, the internal event inside the control facility within the meaning of steps S32 and S42 in FIG. 7 can also be an expiry of an internal control facility test time interval T3 inside the control facility started by the control facility 2 based on transmission of the test signal P. This is described in more detail below in conjunction with FIGS. 8 and 9.

Figure 8:
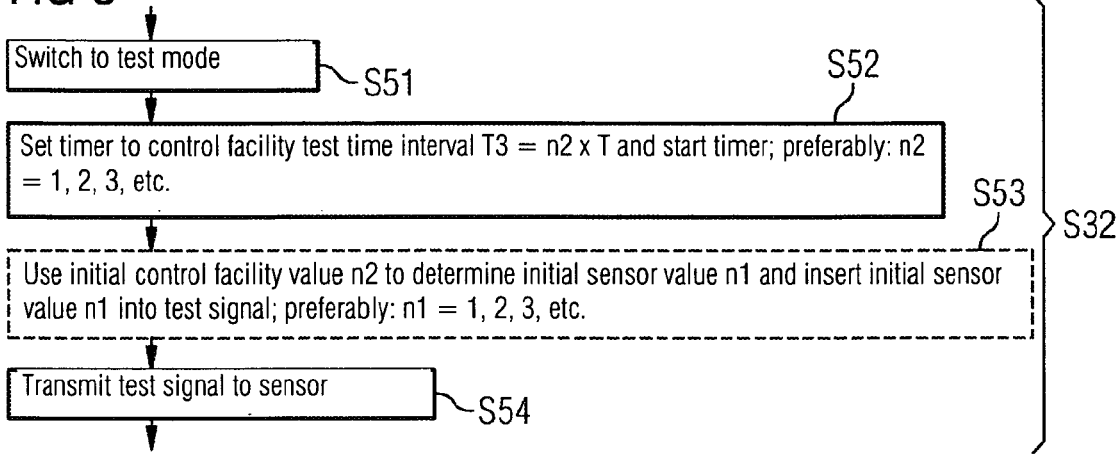

According to FIG. 8, to implement step S32 in FIG. 7, the control facility 2 first switches to test mode in a step S51. In a step S52 it sets a timer 24 to the control facility test time interval T3 and starts the timer 24. The control facility test time interval T3 is the product of an initial control facility value n2 and the cycle time T. The initial control facility value is preferably a whole number and therefore has one of the values one, two, three, etc. However this is not essential.

In a step S53 the control facility 2 uses the initial control facility value n2 to determine the initial sensor value n1. The initial sensor value n1 is also preferably a whole number. In the context of step S53 the control facility 2 also inserts the initial sensor value n1 into the test signal P. The test signal P is therefore a function of the control facility test time interval T3.

Step S53 is merely optional. It is therefore not essential. For this reason it is only shown with a broken line in FIG. 8. If step S53 is omitted, the test signal P is independent of the control facility test time interval T3.

In a step S54 the control facility 2 transmits the test signal P to the sensor 1.

Figure 9:
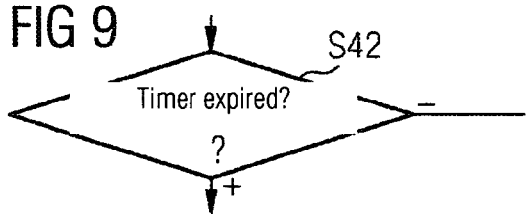

In the case of the embodiment of step S32 according to FIG. 8 it is only necessary for the implementation of step S42 to enquire in step S42 according to FIG. 9 whether the timer 24 has expired.

As an alternative to the expiry of the control facility test time interval T3 it is possible for the internal event inside the control facility to be the reaching of a number of transmissions of the at least one digital signal D, calculated from the switch to test mode. This is described in more detail below in conjunction with FIGS. 10 and 11.

Figure 10:
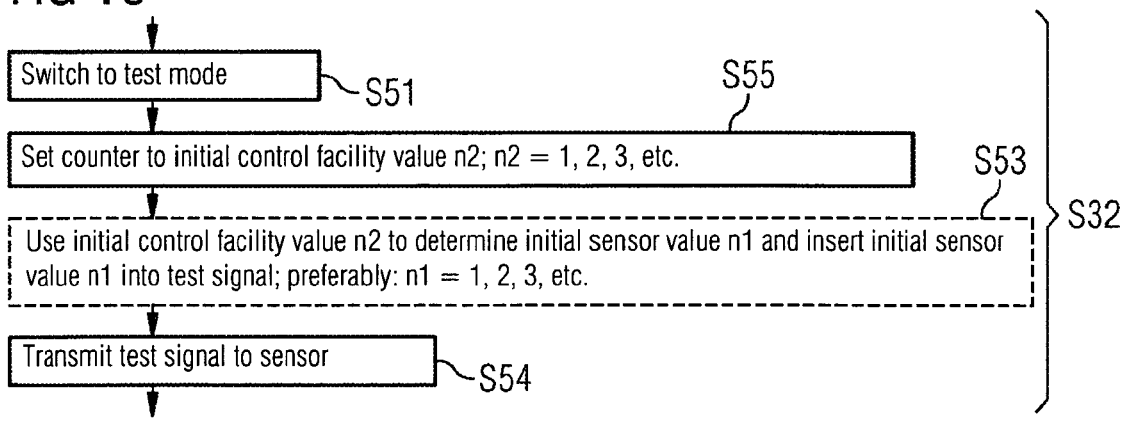

According to FIG. 10, to implement step S32 in FIG. 7, steps S51, S53 and S54 are also executed. Step S53 is merely optional again here and therefore only shown with a broken line.

A step S55 is executed instead of step S52. In step S55 the control facility 2 sets a counter 25 to the initial control facility value n2. For execution in the context of step S55 the initial control facility value n2 must be a whole number, in other words one, two, three, etc.

Figure 11:
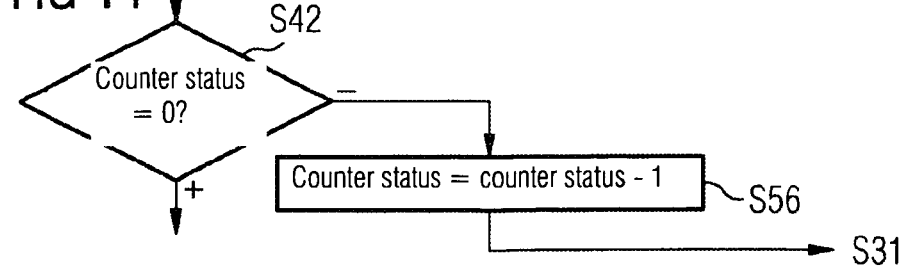

In the case of the embodiment of step S32 according to FIG. 10, for the implementation of step S42 according to FIG. 11, it is necessary in the context of step S42 to check whether the counter status of the counter 25 has reached the value zero. In this instance a step S56 is also inserted after step S42, in which the counter status is decremented by one.

The operating methods described above can be used in particular to carry out effectiveness tests on electric drives, programmable logic controllers and numerical controllers. The inventive operating method allows the sensor 1 to be tested much more simply than before.

The above description serves solely to describe the present invention. The scope of protection of the present invention should however only be determined by the accompanying claims.

The invention claimed is:

1. An operating method of a sensor, comprising:
 a) detecting an analog signal by a detection device;
 b) determining a digital signal by an evaluation device using the analog signal;
 c) transmitting the digital signal to a control device outside the sensor;
 d) supplying the analog signal or the analog signal and the digital signal to a monitoring device;
 e) monitoring a correct operation of the detection device and/or the evaluation device by the monitoring device using the signals supplied to the monitoring device;
 f) transmitting an enable signal to the control device outside the sensor, wherein the enable signal is only transmitted by the monitoring device when the detection device and/or the evaluation device is operating correctly;
 g) repeating steps a) to f) by the sensor in a cyclical manner regardless of whether or not the senor is in a test mode;
 h) assuming a test mode by the sensor, when a test signal is transmitted to the sensor, wherein the sensor manipulates the signals supplied to the monitoring device such that the monitoring device identifies incorrect operation of the detection device and/or the evaluation device when the monitoring device is operating correctly; and
 i) awaiting an occurrence of an internal event inside the sensor while the sensor is in test mode and then automatically quitting test mode.

2. The operating method as claimed in claim 1, wherein the internal event is an expiry of an internal sensor test time interval started by the sensor based on transmission of the test signal.

3. The operating method as claimed in claim 2, wherein the sensor test time interval is a whole-number multiple of a cycle time, wherein the cycle time includes steps a) to f).

4. The operating method as claimed in claim 2, wherein the sensor determines the sensor test time interval based upon the test signal.

5. The operating method as claimed in claim 1, wherein the internal event inside the sensor is the reaching of a number of transmissions of the at least one digital signal, calculated from the assumption of test mode.

6. The operating method as claimed in claim 5, wherein the sensor determines the number of transmissions of the digital signal based on the test signal.

7. An operating method of a control device, comprising:
   a) receiving a digital signal of a sensor located outside a control device;
   b) checking whether an enable signal is transmitted in addition to the digital signal;
   c) repeating steps a) to b) in a cyclical manner regardless of whether the control device is in a normal mode or in a test mode;
   d) further processing of the digital signal in a normal mode, when the enable signal is transmitted in addition to the digital signal and otherwise evaluating the digital signal as defective and outputting a message relating to a malfunction of the sensor;
   e) transmitting a test signal to the sensor periodically and switching from normal mode to test mode;
   f) outputting a message relating to a malfunction of the sensor, when the control device is in test mode, and when the enable signal is transmitted in addition to the digital signal transmitted during test mode;
   g) awaiting an occurrence of an internal event inside the control device when the control device is in test mode, and then switching automatically from test mode to normal mode after the occurrence of the internal event; and
   h) switching from test mode to normal mode.

8. The operating method as claimed in claim 7, wherein the internal event inside the control device is an expiry of an internal control device test time interval started by the control device based upon transmission of the test signal.

9. The operating method as claimed in claim 8, wherein the control device test time interval is a whole-number multiple of a cycle time, wherein the cycle time includes steps a) to b).

10. The operating method as claimed in claim 7, wherein the test signal is a function of the control device test time interval.

11. The operating method as claimed in claim 7, wherein the internal event inside the control device is the reaching of a number of transmissions of the digital signal, calculated from the switch to test mode.

12. The operating method as claimed in claim 11, wherein the test signal is a function of the number of transmissions of the at least one digital signal.

\* \* \* \* \*